United States Patent [19]
Grimes

[11] Patent Number: 6,026,608
[45] Date of Patent: Feb. 22, 2000

[54] ADJUSTMENT STOP FOR LINE WEIGHT

[76] Inventor: David A. Grimes, P.O. Box 224, Carrot River, Saskatchewan, Canada, S0E 0L0

[21] Appl. No.: 09/133,814

[22] Filed: Aug. 13, 1998

Related U.S. Application Data

[60] Provisional application No. 60/055,963, Aug. 18, 1997.

[51] Int. Cl.[7] .................................................. A01K 91/00
[52] U.S. Cl. .......................................... 43/44.91; 43/44.87
[58] Field of Search ................................ 43/44.87, 44.9, 43/44.91, 44.92, 44.93

[56] References Cited

U.S. PATENT DOCUMENTS

| | | | |
|---|---|---|---|
| 332,573 | 12/1885 | Tufts | 43/44.91 |
| 2,379,676 | 7/1945 | Blackstone | 43/44.88 |
| 2,481,346 | 9/1949 | Rigby | 43/44.87 |
| 2,525,067 | 10/1950 | Dungan | 43/44.93 |
| 3,056,229 | 10/1962 | Haney | 43/44.87 |
| 3,084,470 | 4/1963 | Heater | 43/44.91 |
| 3,161,982 | 12/1964 | Lee | 43/43.1 |
| 4,149,336 | 4/1979 | Huse | 43/44.9 |
| 4,644,681 | 2/1987 | Hutson | 43/44.91 |
| 4,986,023 | 1/1991 | Bucholz | 43/44.87 |
| 5,457,909 | 10/1995 | Graves | 43/44.91 |
| 5,490,348 | 2/1996 | Serba | 43/44.93 |
| 5,901,495 | 5/1999 | Leigeber | 43/44.92 |

FOREIGN PATENT DOCUMENTS

| | | | |
|---|---|---|---|
| 719417 | 10/1965 | Canada | 43/44.91 |
| 26734 | 8/1954 | Finland | 43/44.91 |
| 1120300 | 7/1956 | France | 43/44.91 |
| 141923 | 9/1953 | Sweden | 43/44.91 |
| 1519487 | 7/1978 | United Kingdom | 43/44.91 |

*Primary Examiner*—Michael J. Carone
*Assistant Examiner*—Fredrick T. French, III
*Attorney, Agent, or Firm*—Murray E. Thrift; Adrian D. Battison

[57] ABSTRACT

A stop is used with fishing rigs having sliding line weights on a fishing line. The stop can be clamped onto the line at any location as a stop for the weight. A long snell is no longer required. The stop can be released as required to allow the line to be reeled in as far as required to land a fish or to store the rig safely. The stop is a hollow body that will not pass through the eye of the weight, and a pin that slides into the hollow body. The line passes through a transverse bore through the pin. When the pin is drawn into the bore in the body, the line is jammed between the pin and the body, to clamp the stop in place. The pin may have a head on one end to capture the stop body between the line passing through the transverse bore and the pin head. With this arrangement, the stop may be self releasing. Sufficient tension applied to the line will pull the pin end out of the body. The stop will come free to slide along the line. Alternatively the stop may be set up for manual release.

8 Claims, 1 Drawing Sheet

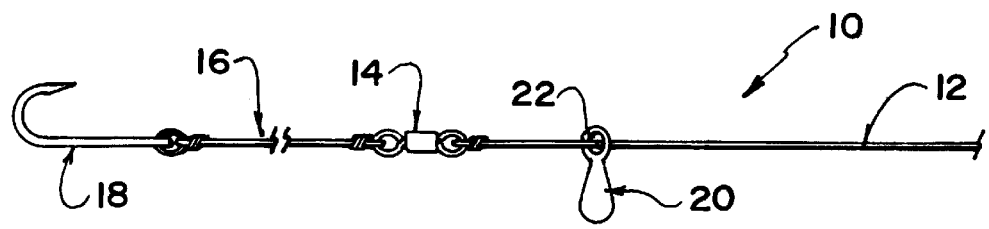
FIG. 1
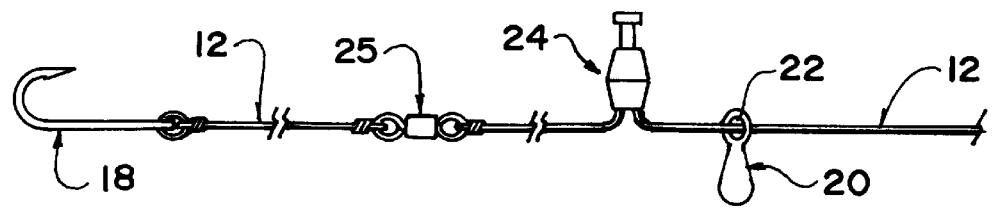
FIG. 2
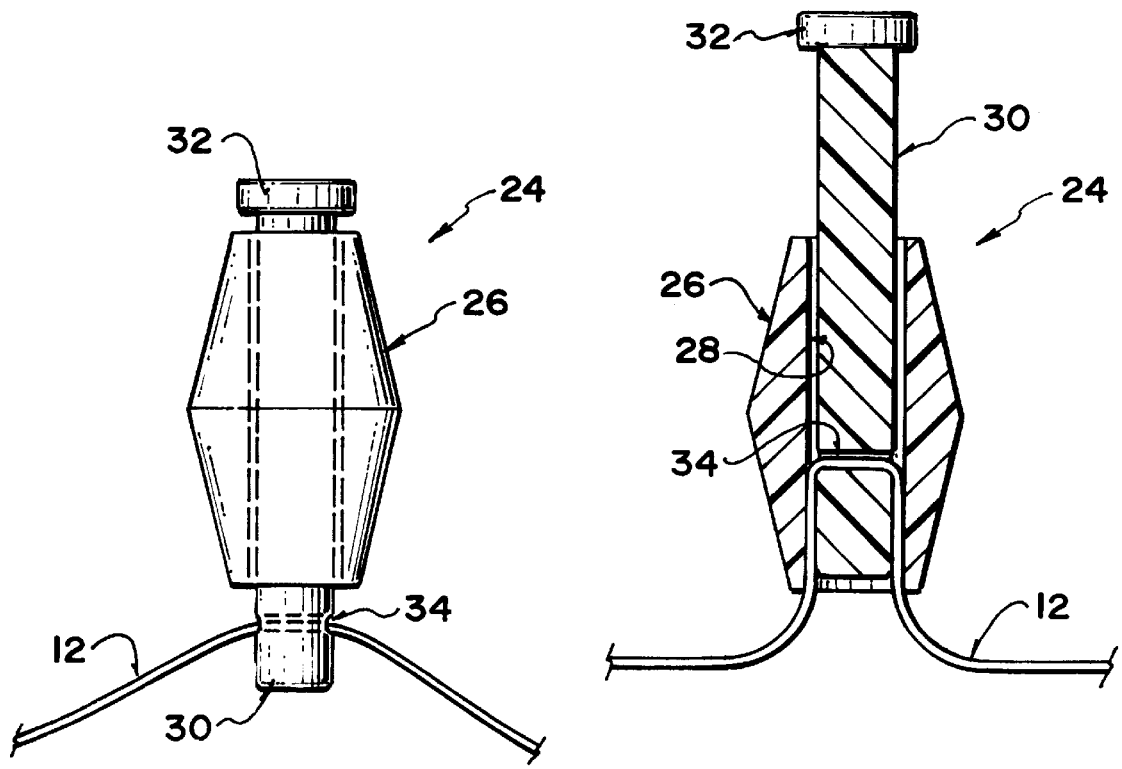
FIG. 3
FIG. 4

ADJUSTMENT STOP FOR LINE WEIGHT

This application claims benefit of Provisional Application No. 60/055,963 filed Aug. 18, 1997.

FIELD OF THE INVENTION

The present invention relates to fishing apparatus and more particularly to a stop for use with fishing rigs with sliding line weights.

BACKGROUND

Conventional practice in rigs with sliding weights is to use a swivel or the equivalent in the line to connect a snelled hook to the line. The swivel stops the weight from sliding down to the hook. With some rigs, such as the Lindy rig, this may leave a very long spacing, up to several feet, between the swivel and the hook. This has a number of disadvantages. It is difficult to land a fish when the hook can only be reeled in to between twelve and sixteen feet of the rod. Additionally, handling of the rod with a long, free length between the swivel and hook is another significant problem.

The present invention is concerned with a solution to this problem.

SUMMARY

According to one aspect of the invention there is provided a stop for use on a fishing line comprising:

a hollow body;

a pin engagable slidably in the body; and a bore transversely through the pin, partway along its length, for receiving the fishing line therethrough.

The stop can be clamped onto the line at any location as a stop for the weight. A long snell is no longer required. As a practical matter, a swivel may be used in the line at about two to three feet (sixty to ninety cm) from the hook to prevent line twisting, particularly if a spinner is used. The stop can be released as required to allow the line to be reeled in as far as required to land a fish or to store the rig safely.

In preferred embodiments, the stop is a hollow body that will not pass through the eye of the weight, and a pin that slides into the hollow body. The line passes through a transverse bore through the pin. When the pin is drawn into the bore in the body, the line is jammed between the pin and the body, to clamp the stop in place.

The pin may have a head on one end to capture the stop body between the line passing through the transverse bore and the pin head. With this arrangement, the stop may be self releasing. Sufficient tension applied to the line will pull the pin end out of the body. The stop will come free to slide along the line. Alternatively the stop may be set up for manual release.

BRIEF DESCRIPTION OF THE DRAWINGS

In the accompanying drawings, which illustrate an exemplary embodiment of the present invention:

FIG. 1 illustrates a Lindy rig;

FIG. 2 illustrates an equivalent Lindy rig employing the present invention;

FIG. 3 is a side view of a stop; and

FIG. 4 is a transverse cross section of the stop.

DETAILED DESCRIPTION

Referring to the accompanying drawings there is illustrated a Lindy rig 10. This includes a fishing line 12 connected at its free end to a swivel 14, which is in turn connected to the end of a snell 16 carrying hook 18. The snell is typically twelve to sixteen feet in length. A weight 20 has an eye 22 that slides on the line 12 above the snell 16. The eye is sufficiently small that it will not pass over the swivel 14.

As illustrated in FIG. 2, an equivalent rig employing the present invention uses a stop 24 attached to the line 12 at the position where the prior art swivel 14 would be located. The hook 18 is connected to the end of the line. A swivel 25 is connected to the line at between two and three feet from the hook in order to prevent line twisting. This swivel may not be required in all rigs.

Referring to FIGS. 3 and 4, the illustrated stop includes a hollow body 26 with a cylindrical through bore 28. A pin 30 slides in the bore 28 it carries a head 32 at one end that prevents the pin from sliding completely through the body. The line 12 is threaded through a transverse bore 34 through the pin receives. The line will slide through the transverse bore 34 so that the stop can be positioned wherever it is desired.

To fix the stop to the line, the pin is pulled through the body to draw the transverse bore 34 into the longitudinal bore 28 in the body. The clearance between the pin and the body is sufficiently small to jam the line on opposite sides of the pin into the bore 28. This effectively clamps the stop 24 to the body. In self releasing versions of the pin, the transverse bore through the pin and the head on the pin are spaced apart a distance greater than the length of the hollow body. Tension on the line may be sufficient to draw the pin from its locked position to the released position shown in FIG. 3, where the transverse bore 34 is clear of the bore 28 through the stop body.

This invention provides the benefits of the Lindy rig and any similar rigs while avoiding the problems inherent in having several feet of snell that cannot be reeled in for landing a fish or storing one's gear. Any length of line between the hook and the weight can be used.

While one particular embodiment of the present invention has been described the foregoing, it is to be understood that other embodiments are possible within the scope of the invention and are intended to be included herein. The invention is to be considered limited solely by the scope of the appended claims.

I claim:

1. In a fishing rig comprising a fishing line, at least one hook attached to the line and a weight with an eye slideable along the line, a stop on the line between the hook and the weight for limiting travel of the weight eye along the line, the stop comprising a body of a size sufficient that it will not pass through the eye and clamp means for releasably clamping the body to the line.

2. The invention of claim 1 wherein the body is a hollow body and the clamp means comprise a pin slideable into the body.

3. The invention according to claim 2 including line engagement means on the pin for forcing the line into the body.

4. The invention as defined in claim 3 wherein the line engaging means comprise a bore through the pin.

5. The invention according to claim 4 wherein the bore is a transverse bore through the pin.

6. A fishing rig comprising a fishing line, a hook secured to an end of the fishing line, a weight with an eye freely slideable along the fishing line and a stop larger than the eye of the weight on the fishing line between the hook and the weight, said stop comprising:

a pin;

a bore transversely through the pin, partway along its length and having the fishing line therethrough; and a hollow body engaged slideably on the pin and frictionally engaging the fishing line between the body and the pin.

7. A rig according to claim 1 wherein the pin has a head that limits movement of the pin into the hollow body.

8. A rig according to claim 7 wherein the transverse bore through the pin and the head on the pin are spaced apart a distance greater than the length of the hollow body.

* * * * *